(12) United States Patent
Levin et al.

(10) Patent No.: US 6,671,670 B2
(45) Date of Patent: Dec. 30, 2003

(54) SYSTEM AND METHOD FOR PRE-PROCESSING INFORMATION USED BY AN AUTOMATED ATTENDANT

(75) Inventors: Esther Levin, Livingston, NJ (US); Susan Boyce, Rumson, NJ (US); Brian Helfrich, New York, NY (US); Amir Mane, Lincroft, NJ (US); Alison Schondorf, West Orange, NJ (US); Ilija Zeljkovic, Scotch Plains, NJ (US)

(73) Assignee: Telelogue, Inc., Iselin, NJ (US)

( * ) Notice: Subject to any disclaimer, the term of this patent is extended or adjusted under 35 U.S.C. 154(b) by 206 days.

(21) Appl. No.: 10/041,620

(22) Filed: Jan. 10, 2002

(65) Prior Publication Data

US 2003/0225571 A1 Dec. 4, 2003

Related U.S. Application Data

(60) Provisional application No. 60/300,867, filed on Jun. 27, 2001.

(51) Int. Cl.$^7$ .......................... G10L 21/00; G06F 17/30
(52) U.S. Cl. ........................ 704/270; 704/10; 704/257; 707/5; 707/201
(58) Field of Search .......................... 704/257, 10, 251, 704/270; 707/3, 4, 5, 6, 201

(56) References Cited

U.S. PATENT DOCUMENTS

| | | | |
|---|---|---|---|
| 5,488,652 A | 1/1996 | Bielby et al. | 379/88 |
| 5,638,425 A | 6/1997 | Meador, III et al. | 379/88 |
| 5,839,107 A | 11/1998 | Gupta et al. | |
| 5,940,793 A | 8/1999 | Attwater et al. | 704/231 |
| 6,370,547 B1 | 4/2002 | Eftink | 707/201 |
| 6,377,921 B1 * | 4/2002 | Bahl et al. | 704/243 |
| 6,421,672 B1 | 7/2002 | McAllister et al. | 707/10 |

OTHER PUBLICATIONS

M.F. Spiegel and E. Winslow, "Database Preprocessing and Human–Interfac Issue in Reverse Directory Assistance (ACNA) Services", IEEE Communications Society Workshop Proceedings, Sep. 30–Oct. 1, 1996, p. 105–110, Piscataway, New Jersey.

(List continued on next page.)

Primary Examiner—Richemond Dorvil
Assistant Examiner—Abul K. Azad
(74) Attorney, Agent, or Firm—Kenyon & Kenyon

(57) ABSTRACT

The invention concerns method and system for pre-processing entries in a directory listings. An automated attendant or automated directory listings assistant may use the pre-processed entries. A first directory listings including one or more fields may be received. The one or more fields may be populated with entries including one or more symbol strings. A second directory listings including one or more fields may be received. The one or more fields of the second directory listings may be populated with entries including one or symbol strings. Entries in the one or more fields of the first directory listings may be correlated with entries in the corresponding one or more fields of the second directory listings. Entries, in the one or more fields of the first directory listings, which do not correlate with entries in the corresponding one or more fields of the second directory listings may be identified. The identified entries may be processed using a rule set corresponding to the field in which the entry is located. Based on the rule set, a corresponding confidence level for the processed entries may be determined. The processed entries having the corresponding confidence level meeting or exceeding a threshold may be automatically modified. The automatically modified entries may be outputted for processing. In alternative embodiments of the present invention, the processed entries having the corresponding confidence level below the threshold may be marked for operator confirmation.

28 Claims, 4 Drawing Sheets

OTHER PUBLICATIONS

M.F. Spiegel and E. Winslow, "Advanced in the Implementation of Effective Reverse Directory (ACNA) Services", AVIOS '95 Conference Proceedings, Sep. 12–14, 1995, p. 145–152.

M.F. Spiegel, "Coping With Telephone Directories That Were Never Intended for Synthesis Applications", AVIOS '93 Conference Proceedings, Sep. 28–30, 1993, p. 75–81.

M.F. Spiegel, Using the ORATOR® Synthesizer for a Public Reverse–Directory Service: Design, Lessons, and Recommendations, ESCA's EUROSPEECH '93 Conference Proceedings, Sep. 21–23, 1993, p. 1897–1900.

Telcordia Softward Distribution to Telelogue, "Orator II, Phonetic Pronunciation Package, Directory Preprocessing Programs, Maintenance Programs", Jan. 2001.

* cited by examiner

SYSTEM AND METHOD FOR PRE-PROCESSING INFORMATION USED BY AN AUTOMATED ATTENDANT

This patent application claims benefit of U.S. Provisional Patent Application Serial No. 60/300,867 filed Jun. 27, 2001.

TECHNICAL FIELD

The present invention relates to automatic directory assistance. In particular, the present invention relates to systems and methods for automatically pre-processing entries contained in an informational database used by an automated attendant.

BACKGROUND OF THE INVENTION

In recent years, automated attendants have become very popular. Many individuals or organizations use automated attendants to automatically provide information to callers and/or to route incoming calls. An example of an automated attendant is an automated directory assistant that automatically provides a telephone number, address, etc. for a business or an individual in response to a user's request.

Typically, a user places a call and reaches an automated directory assistant (e.g. an Interactive Voice Recognition (IVR) system) that prompts the user for desired information and searches an informational database (e.g., a white pages listings database) for the requested information. The user enters the request, for example, a name of a business or individual via a keyboard, keypad or spoken inputs. The automated attendant searches for a match in the informational database based on the user's input and may output a voice synthesized result if a match can be found.

When offering automated directory assistance, the informational database may be used for two purposes. One purpose may be to create vocabularies and grammars for the speech recognition engine that recognizes the caller's request and a search engine that searches for a match. The other purpose may be to generate a speech-synthesized output of the requested listing to the caller.

The information or listings contained in these informational databases may contain abbreviations, acronyms, errors, or other deviations that may prevent the search engine from recognizing the listing as well as the speech synthesizer from pronouncing the listings so that it is understood by the caller. For example, the system may not be able to recognize or pronounce the abbreviation "CLD HARBR SPRNG" to mean "Cold Harbor Springs." In another example, the speech recognition engine may not understand a caller's request if the caller uses the abbreviation "N-C-double A" to mean "N-C-A-A."

Additionally, directory listings are typically optimized for visual presentation, not for conversation. Thus, the word order is often reversed and acronyms are used extensively. Such deviations may further prevent the listing from being recognized. For example, the listing "Smith Joe S., MD" may not be recognized if the caller says "Doctor Joe S. Smith."

Such deviations in the listings database and/or in the way caller's may pronounce a requested listing may prevent the caller's request for information from being completed automatically or may delay its completion.

One approach to solving this problem involves having an operator personally inspect each database entry individually and fine-tuning each listing. This conventional technique can be impractical when hundreds of thousands and even millions of listings are not only involved, but may also be in a continual state of flux, as is the case with telephone directory listings. Additionally, errors, abbreviations, acronyms, etc. may require intervention of an operator, which can delay the process and prevents complete automation, which is desirable.

SUMMARY OF THE INVENTION

Embodiments of the present invention concern a method and system for pre-processing entries in directory listings. An automated attendant or automated directory listings assistant may use the pre-processed entries. A first directory listings including one or more fields may be received. The one or more fields may be populated with entries including one or more symbol strings. A second directory listings including one or more fields may be received. The one or more fields of the second directory listings may be populated with entries including one or more symbol strings. Entries in the one or more fields of the first directory listings may be correlated with entries in the corresponding one or more fields of the second directory listings. Entries, in the one or more fields of the first directory listings, which do not correlate with entries in the corresponding one or more fields of the second directory listings may be identified. The identified entries may be processed using a rule set corresponding to the field in which the entry is located. Based on the rule set, a corresponding confidence level for the processed entries may be determined. The processed entries having the corresponding confidence level meeting or exceeding a threshold may be automatically modified. The automatically modified entries may be outputted for processing. In alternative embodiments of the present invention, the processed entries having the corresponding confidence level below the threshold may be marked for operator confirmation.

BRIEF DESCRIPTION OF THE DRAWINGS

Embodiments of the present invention are illustrated by way of example, and not limitation, in the accompanying figures in which like references denote similar elements, and in which.

DETAILED DESCRIPTION

Embodiments of the present invention relate to an automated and/or semi-automated system that can pre-processes directory listings or other information so that the information can be automatically recognized and/or presented to a user. Embodiments of the present invention may utilize a series of pre-processing steps to, for example, correct typographical errors, expand abbreviations to be context sensitive, correct order of words, expand acronyms, and/or specify how acronyms, proper names (people and places) and/or other information should be pronounced.

The listings pre-processing system, in accordance with embodiments of the present invention, may process listings entries according to a rule set. For example, the system may generate a pre-processed listings output and a corresponding confidence level for each pre-processed listing. The confidence level may be generated based on the rule set to indicate the level of certainty with which the listing was corrected or preprocessed. If, for example, a processed listing has a corresponding confidence level above or at a predetermined threshold, the listing may be sent directly to an automated attendant for immediate use in speech recognition and/or speech synthesis. Optionally and/or additionally, such high confidence outputs may be sent to a storage device for use at a later time and/or to any other device.

Alternatively, in embodiments of the present invention, if a processed listing has a corresponding confidence level below a predetermined threshold, the processed listing may be sent immediately to, for example, an operator for confirmation and/or correction. Optionally and/or additionally, such low confidence outputs may be sent to a storage device for use at a later time and/or to any other device.

Embodiments of the present invention may include a graphical user interface (GUI) for presenting, to the operator, the low confidence or questionable listings together with, for example, suggested possible corrections for selection by the operator. Using the GUI, the operator may modify the questionable listings based on one or more rules included in the pre-determined rule set or, alternatively, the operator may modify the questionable listing based on the operator's personal discretion. In embodiments of the present invention, the operator may create additional rules that may be used to pre-process the listings. These additional rules, created by the operator, may be included in the predetermined rule set to pre-process the listings in accordance with embodiments of the present invention.

Figure 1:
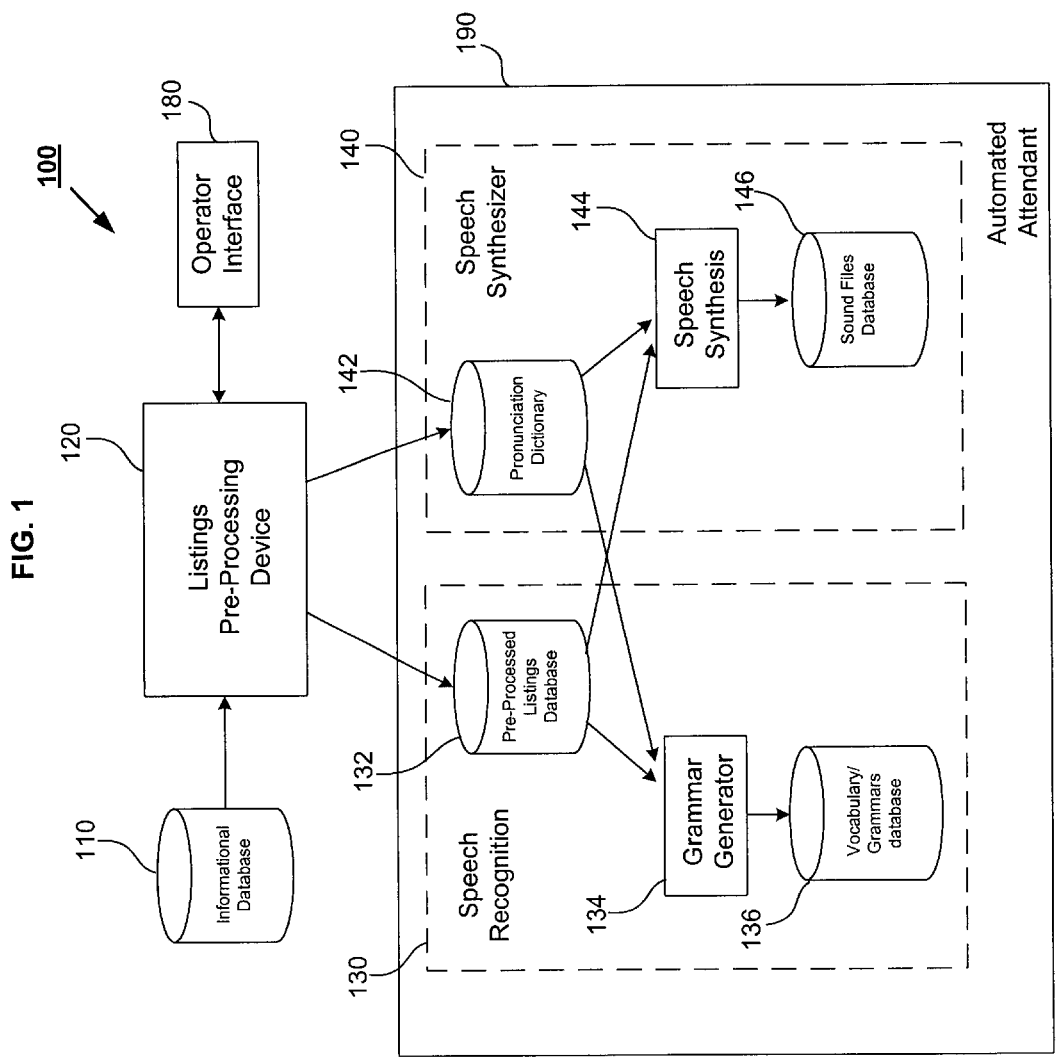
FIG. 1 is a block diagram of a directory listings pre-processing system in accordance with an embodiment of the present invention.

FIG. 1 is a block diagram of a directory listings pre-processing system 100 according to an exemplary embodiment of the present invention. The directory listings pre-processing system 100 may include a listings pre-processing device (LPPD) 120 that may operate in accordance with embodiments of the present invention.

In embodiments of the present invention, the LPPD 120 may receive information entries from an informational database 110. For example, the informational database 110 may be a white pages listings database that may include a plurality of fields including one or more information entries. The plurality of fields may include names of individuals and/or businesses, corresponding street addresses, township, city, state and/or country names, zip codes, telephone numbers, e-mail addresses, web site addresses, and/or any other information relating to the individuals and/or businesses. It is recognized that the database 110 may include any type of information that may be used by automated attendants to provide a variety of products and/or services to users. It is also recognized that embodiments of the present invention may be used to pre-process any type of information to correct errors, expand abbreviation, add abbreviations, expand acronyms, add acronyms, etc.

In embodiments of the present invention, entries in the various databases, referred to or described herein, may include one or more symbol strings. Symbol strings as used herein may be text or character strings that represent individual or business listings and/or other information.

Although FIG. 1 shows the informational database 110 as a single database, it is recognized that the database 110 may be a plurality of different databases where each database may contain specific type of information. For example, one type of the informational database 110 may contain only individual and/or business names, while another type may contain only addresses, while yet another type may contain names and corresponding phone numbers and/or corresponding township names, etc.

The database 110 may be a typical information repository such as white pages listings database used by automated directory assistants to search for and provide information to callers. Typically, the database 110 may contain at least some entries that may contain errors or other deviations that may prevent the entry from being recognized automatically by, for example, a speech recognizer and/or pronounced by a speech synthesizer. For example, the database 110 may contain entries, in one or more fields, that contain spelling errors, typographical errors, acronyms, abbreviations, improper or varying pronunciation, improper or varying word order and/or other informalities that may prevent entries from being speech recognizer and/or pronounced by a speech synthesizer.

In embodiments of the present invention, LPPD 120 may receive and/or retrieve informational entries from the database 110 and may pre-process the entries based on one or more pre-determined rule sets, in accordance with embodiments of the present invention (to described below in more detail). Pre-processing the entries of database 110, in accordance with embodiments of the present invention, may reduce the delays and/or in-efficiencies that may otherwise be encountered by, for example, an automated directory assistant when searching for a user's request.

In embodiments of the present invention, after the LPPD 120 pre-processes the entries from database 110, the pre-processed entries may be forwarded to, for example, the automated attendant 190 for storage and/or immediate use.

In embodiments of the present invention, the pre-processed entries may be stored in the pre-processed listings database 132 located in, for example, the speech recognition system 130 of automated attendant 190. The grammar generator 134 may generate one or more grammars using the pre-processed entries stored in pre-processed listings database 132. The grammar generator 134 may be any type of known hardware and/or software device for generating grammars. The generated grammars may be stored in the vocabulary/grammars database 136. The automated attendant 190 may utilize the grammars generated based on the pre-processed listings to search for the user's request for information.

In accordance with embodiments of the present invention, the automated attendant 190 may further utilize the pre-processed entries received from LPPD 120 to generate a spoken output for the requested information using speech synthesizer 140. The pre-processed entries may be stored in pronunciation dictionary 142 and forwarded to the speech synthesis device 144. The speech synthesis device 144 may be any type of speech synthesizer known in the art. The pronunciation dictionary 142 may include at least one pronunciation of each word of the pre-processed entries received from the LPPD 120. The speech synthesis device 144 may generate sound files based on the pre-processed listings received from PD 120 and store the generated sound files in sound files database 146. The generated sound files from database 146 may be output to the user by automated attendant 190 to complete the user's request for information.

The automated attendant 190 may include other components and/or devices that are not shown for simplicity. The automated attendant 190 may engage in further dialog with the user to provide additional information, and/or to conduct additional searches in the event the user is not satisfied by the results provided by the automated attendant 190. Additionally, the automated attendant may provide the user with other services such as initiating a call on the user's behalf based on the searched information and/or other known automated services.

Figure 2:
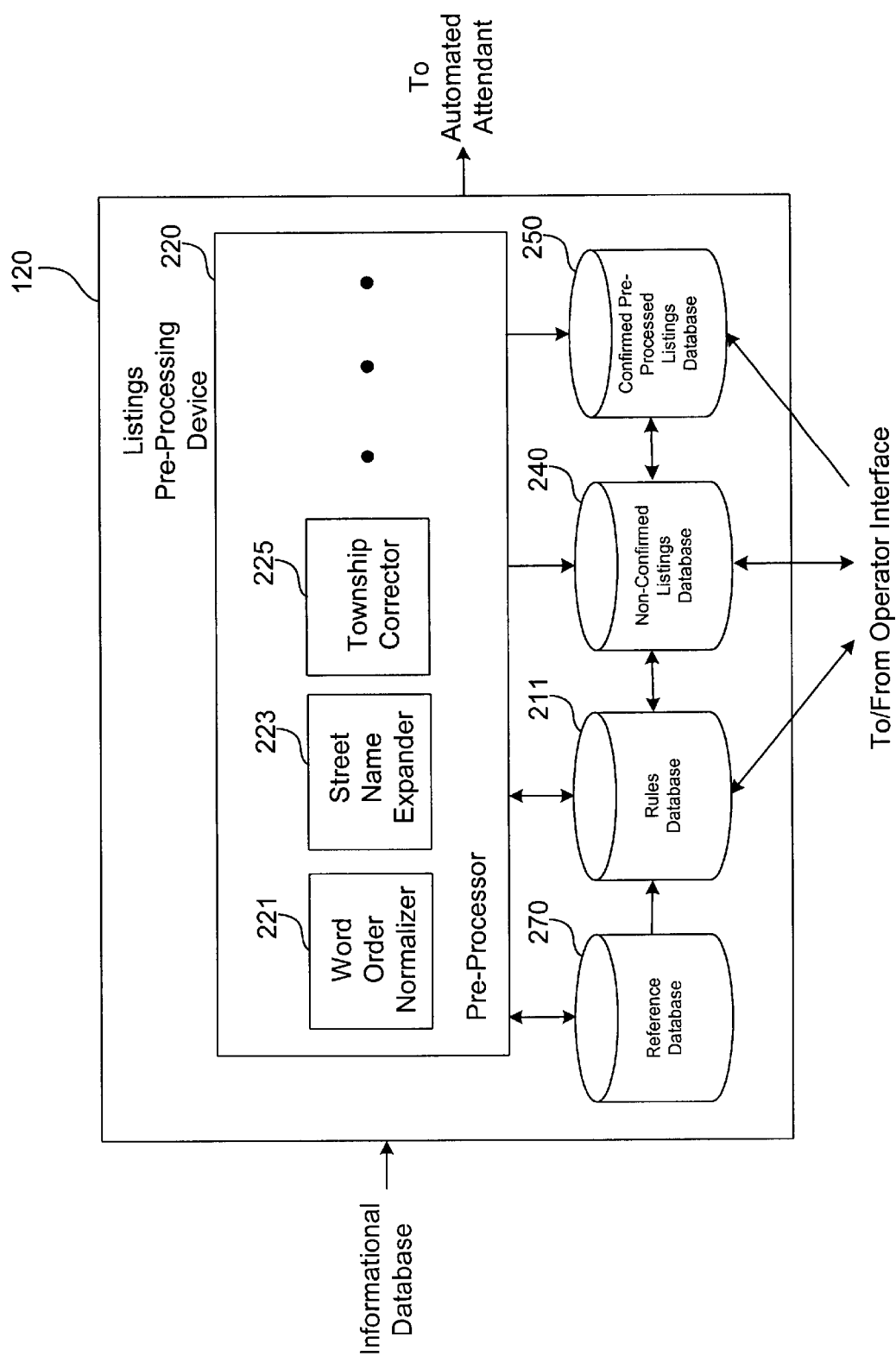
FIG. 2 illustrates a block diagram of a listings pre-processing device in accordance with an embodiment of the present invention.

FIG. 2 is a block diagram of the LPPD 120 in accordance with an embodiment of the present invention. The LPPD 120 may include a pre-processor 220, a reference database 270, a rules database 211, a non-confirmed listings database 240 and a confirmed pre-processed listings database 250. It is recognized that any suitable hardware and/or software may be used by one of ordinary skill in the art to configure and/or implement the LPPD 120 in accordance with embodiments of the present invention.

In embodiments of the present invention, the pre-processor 220 may include, for example, a word order normalizer 221, a street name expander 223, and/or a township corrector 225. The pre-processor 220 may include additional components such as a spelling checker, abbreviation expander, acronym detector, pronunciation generator, grammar checker, and/or corrector, etc. (not shown).

In embodiments of the present invention, the plurality of databases (e.g., databases 270, 211, 240, 250, etc.) shown can be stored in a memory device that may be located internal to and/or external to the LPPD 120.

In embodiments of the present invention, LPPD 120 may receive, for example, a white pages listings from informational database 110 for pre-processing. The white pages listings from database 110 may contain a plurality of fields that contain a plurality of entries. The white pages listings database 110 may include such fields as individual and/or business names, corresponding street addresses, townships, zip codes, etc. It is recognized that the white pages listings database 110 may include additional fields containing, for example, e-mail addresses, web page addresses, phone numbers, etc.

In embodiments of the present invention, the listings pre-processing device 120 receives the plurality of entries from, for example, the white pages listings database 110 and may pre-process the entries according to one or more rules included in the rules database 211. The pre-processed entries may be forwarded to, for example, an automated attendant or to an operator. The listings may be pre-processed periodically or may be preprocessed as desired by, for example, an operator.

In embodiments of the present invention, the word order normalizer 221 may correct the order of names included in the "Names" field of listings database 110 based on corresponding rules in the rules database 211. The normalizer 221 may recognize that the names field from the plurality of fields included in the database 110 using, for example, clues in the corresponding entries to identify that the listing corresponds to a person's name. For example, the normalizer 221 may look for titles such as doctor, MD, accountant, Esq., etc. appearing in the entry to identify that the listing represents an individual's name. After the field is recognized, the normalizer 221 may verify and correct, if necessary, the order of the names in the corresponding field.

In embodiments of the present invention, the normalizer 221 may correlate the first and the last names as appearing in the each entry of the listings database 110 to corresponding entries in the reference database 270. The normalizer 221 may identify entries in the database 110 that correspond to a name and title of an individual. The reference database 270 may be a pre-verified database that may contain, for example, a list of the top N (e.g., 10000) frequent first names, and top N most frequent last names. The normalizer 221 then may correlate each word in the listing to the reference database 270, and determine which is likely to be a given name and which is the family name, and change the order of the words accordingly. In alternative embodiments of the present invention, the reference database 270 may be, for example, a pre-verified database that is used by, for example, a postal service. In this case, the reference database 270 may contain names, street names, and full addresses, etc. of individuals and/or businesses in a particular community, town, city, state, and/or country. It is also recognized that reference database 270 can be any type of database containing verified entries that can be used to verify entries included in any other type of database.

In embodiments of the present invention, after the normalizer 221 identifies entries in the database 110 that do not correlate with corresponding entries in the reference entries, the normalizer 221 may process those entries in accordance with the corresponding rule in the rules database 211. The order normalizer 221 may identify, based on the correlation with the reference database 270, entries in the listings database 110 that have, for example, inverted or otherwise errant entries.

For example, during a pre-processing step, normalizer 221 may receive an entry such as "Smith, John M.D." specified in the names field. The normalizer 221 may confirm that the entry belongs in the names field based on, for example, the title "M.D." included in the entry. Based on a rule set for the word order normalizer 221 contained in the rule set database 211, the normalizer 221 may compare the entries "Smith" and "John" with entries contained in the given and family names fields of the reference database 270.

In embodiments of the present invention, the reference database 270 may be, for example, a list of the top N (e.g., 10000) frequent first names, and top N most frequent last names. The normalizer 221 may find a match for the entry "Smith" in the frequent family names field, and for "John" in the frequent given names field in the reference database 270. The normalizer 221 may determine that the name or word order of the entry should be re-arranged to read "John Smith."

In addition, based on a rule set for the normalizer 221 contained in the rule set database 211, the abbreviation "M.D." may be changed or expanded to "Doctor." Accordingly, the normalizer 221 may modify the entry "Smith, John M.D." to "Doctor John Smith."

In embodiments of the present invention, after the entry has been modified, the pre-processor 220 may determine, based on the rules used to modify the entry from rules database 211, a confidence level for the corresponding pre-processed entry. The determined confidence level may be compared to a pre-determined threshold that may be set for one or more entries. It is recognized separate threshold levels can be set for a particular entry or particular types of entries. For example, entries in the "Names" may have a one threshold and entries in the "Address" field may have another threshold. If a pre-processed entry has a corresponding confidence level above the corresponding threshold (also referred to herein as being processed with a high level of confidence), the modified entry may be stored in the confirmed pre-processed listings database 250 and/or may be forwarded directly to the automated attendant 190.

In embodiments of the invention, the confidence levels can be determined dynamically, based upon the rules and degree of correlation with the reference database 270. For example, the entry "John Michael M.D" may be converted to "Doctor Michael John" with low confidence because both "John" and "Michael" are listed as frequent given names in the reference database 270. The entry "Smith John J. MD" may be converted to "Doctor John J. Smith" with a high confidence level, since "John" is a likely given name and "Smith" is a likely family name according to the reference database 270. Additionally, this entry may have a high confidence level based on a rule that, for example, says that a middle initial is likely to follow a given name, as opposed to family name.

In alternative embodiments of the present invention, if a pre-processed entry has a corresponding confidence level below the corresponding threshold (also referred to herein as being processed with a low level of confidence), the modified entry may be forwarded to, for example, the non-confirmed listings database 240. The non-confirmed listings database 240 may be accessed by an operator using an operator interface 180. The operator may check the entry to determine if the entry is correct or may modify the entry in accordance with embodiments of the present invention (to be described below in more detail).

In embodiments of the present invention, street name expander 223 may receive and pre-process entries in the "Address" field of the listings database 110 based on corresponding rules in the rules database 211. The street name expander 223 may identify entries in the database 110 that do not match or correlate with the corresponding entries in the reference database 270. For example, the entries located in the address field may include street names that may include abbreviations that may need to be expanded, and/or typographical errors and/or misspellings that need to be corrected. The street name expander 223 may receive all of the entries in the address field from database 110 and correlates the street name in each entry of database 110 to street name entries located in the reference database 270 to correct any deviations in the database 110.

According to the rule set in the rules database 211, the street name expander 223 may correlate only entries with respect to a township, city, etc. in which the street address in located. In alternative embodiments of the present invention, the street name expander 223 may correlate all of the entries in the database 110 with corresponding entries in reference database 270. The street name expander 223 may compare street address entries in the listings database 110 with corresponding field entries in the reference database 270.

If the expander 223 identifies entries in database 110 that do not correlate with corresponding entries in the reference database 270, the expander 223 may, based on the corresponding rules 211, modify such entries as needed. If a close match between a corresponding entry of the database 110 and reference database 270 is found, the street name in the database 110 may be modified. For example, the entry "Yale Dr." may be modified to "Yale Drive" based on a match found in the reference database 270. Additionally, street name expander 223 may modify the entry to correct other errors that may be included in the entry.

If the modification is performed with a high level of confidence, the modified entry may be sent to the confirmed pre-processed listings database 250 for storage and/or sent to the automated attendant 190. Alternatively, if the modification is performed with a low level of confidence, the modified entry may be forwarded to the non-confirmed listings database 240 for operator confirmation and/or modification as described herein.

In embodiments of the present invention, township corrector 223 may receive and pre-process entries in the "Township" field of the listings database 110 based on corresponding rules in the rules database 211. As used herein, the term, township may refer to the community, town, the city, state, etc. of interest. In embodiments of the present invention, township corrector 225 may correlate entries in the township field of white pages listings database 110 with corresponding entries in the reference database 270.

In embodiments of the present invention, the township corrector 225 may employ corresponding rules from rules database 211 to pre-process the township entries. The township corrector 225 may identify entries in the database 110 and that do not match or correlate with the corresponding entries in the reference database 270. For example, based on the rules, the township corrector 225 may correlate the township entries in database 110 with corresponding entries in the reference database 270 to expand abbreviations, and/or to correct typographical errors and/or misspellings, or to remove extraneous information included in the township entry. For example, the township corrector 225 may remove extraneous information, for example, words such as township, city, etc. after a valid name, and/or hyphens or other punctuation that does not appear in the corresponding township entries in the reference database 270.

In embodiments of the present invention, the township corrector 225 may use, for example, a zip code entry to correlate township name in the database 110 with corresponding entries in the reference database 270.

If the township corrector 225 identifies entries in database 110 that do not correlate with corresponding entries in the reference database 270, the township corrector 225 may, based on the corresponding rules 211, modify such entries as needed. If the modification is performed with a high level of confidence, the modified entry may be sent to the confirmed pre-processed listings database 250 for storage and/or sent to the automated attendant 190. Alternatively, if the modification is performed with a low level of confidence, the modified entry may be forwarded to the non-confirmed listings database 240 for operator confirmation and/or modification as described herein.

It is recognized that spelling and/or punctuation/grammar errors may be corrected as the components of the pre-processor 220 process the entries of database 110 as described above. Alternatively, the pre-processor 220 may also include a separate spelling checker and/or grammar checker (not shown) to correct spelling and/or grammar errors in the entries.

Figure 3:
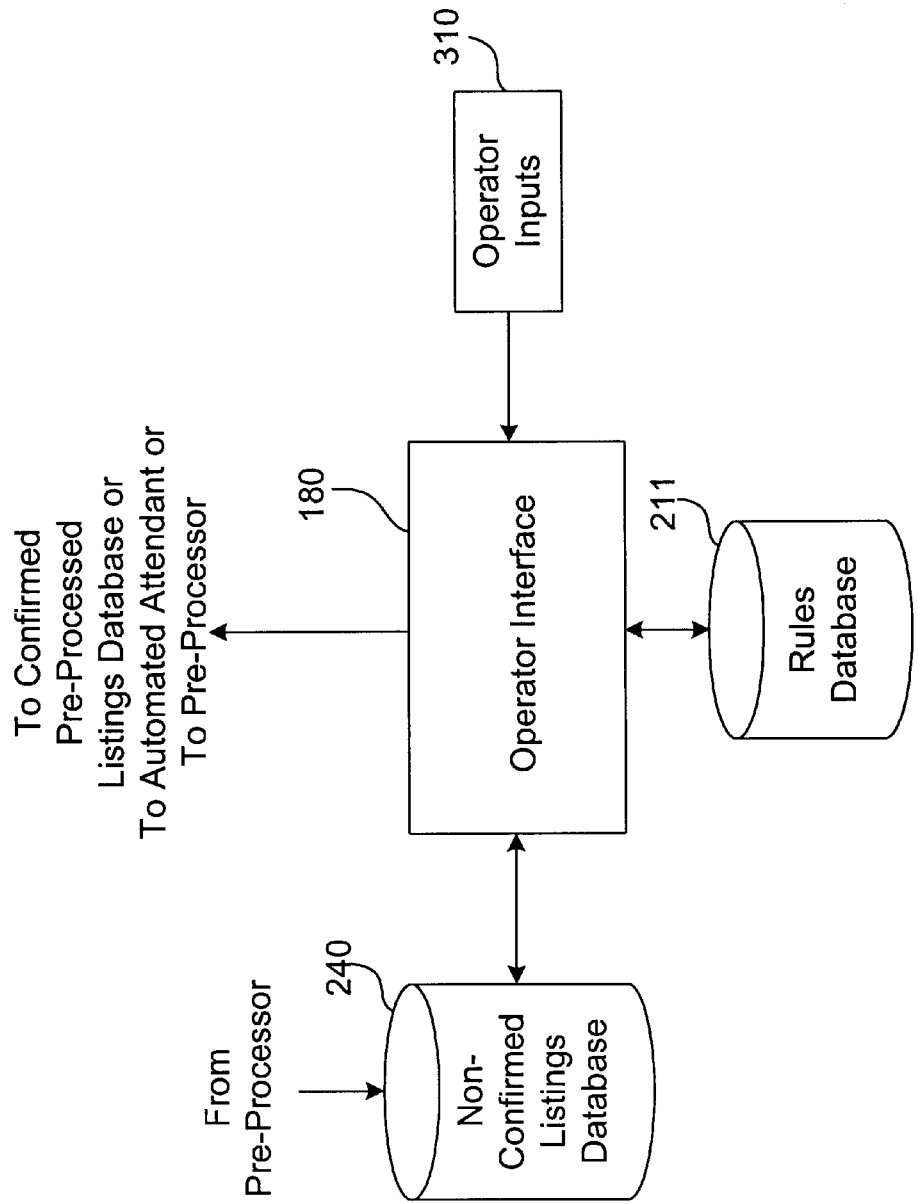
FIG. 3 is block diagram of a graphical user interface in accordance with an exemplary embodiment of the present invention.

FIG. 3 is a block diagram illustrating the use of an operator interface 180 in accordance with an embodiment of the present invention. The operator interface 180 may be a GUI used by an operator to confirm and/or modify entries pre-processed by pre-processor 220 with a low confidence level. Additionally, the operator interface 180 may be used to edit and/or add rules to the rules database 211.

In embodiments of the present invention, if the pre-processor 220 determines, based on the rules in database 211, that an entry in database 110 was modified or pre-processed with a low confidence level, the entry is forwarded to the non-confirmed listings database 240, as shown in FIG. 3. In embodiments of the present invention, using interface 180 an operator may access the non-confirmed entries residing in database 240 and determine whether the modifications are correct. If the low confidence modifications are determined to be correct by the operator, the modified entries may be sent to the confirmed preprocessing listings database 250 for storage and/or to the automated attendant 190.

Alternatively, in embodiments of the present invention, if the operator determines that one or more entries in the non-confirmed listings database 240 are not correct, the operator using operator interface 180 may be presented with a plurality of suggested corrections that had been generated by the system using the rules in rules database 211, that may be used to modify the entry. Using the input interface 300, the operator may select one of the choices presented by the GUI 180. The operator's choice may be captured by the GUI 180 and the pre-processor may pre-process the entry in accordance with the selected correction. Alternatively, the operator may modify the entry at the operator's discretion. The modified entry may be sent to the confirmed pre-processing listings database 250 for storage and/or to the automated attendant 190.

In alternative embodiments of the present invention, the operator may use the GUI 180 to compile a new rule set and/or modify an existing rule set. The newly compiled rule set may be captured by the GUI 180 and the pre-processor may pre-process the entry in accordance with newly compiled rule set. If a new rule is compiled, the operator may also choose the scope of application for the new rule. In other words, the GUI 180 may present the operator with selections relating to the scope of the new or modified rules. In other words, the operator may select how the newly compiled rules should be applied. The operator may select that the newly compiled rule should be applied globally, for the current case only, for future cases, for previous cases, for all names, for all states, for all townships and/or any other case desirable. Using the input interface 300, the operator may select one of the choices presented by the GUI 180. The operator's choice may be captured by the GUI 180 and the pre-processor may apply the rule in accordance with the operator's selection.

Figure 4:
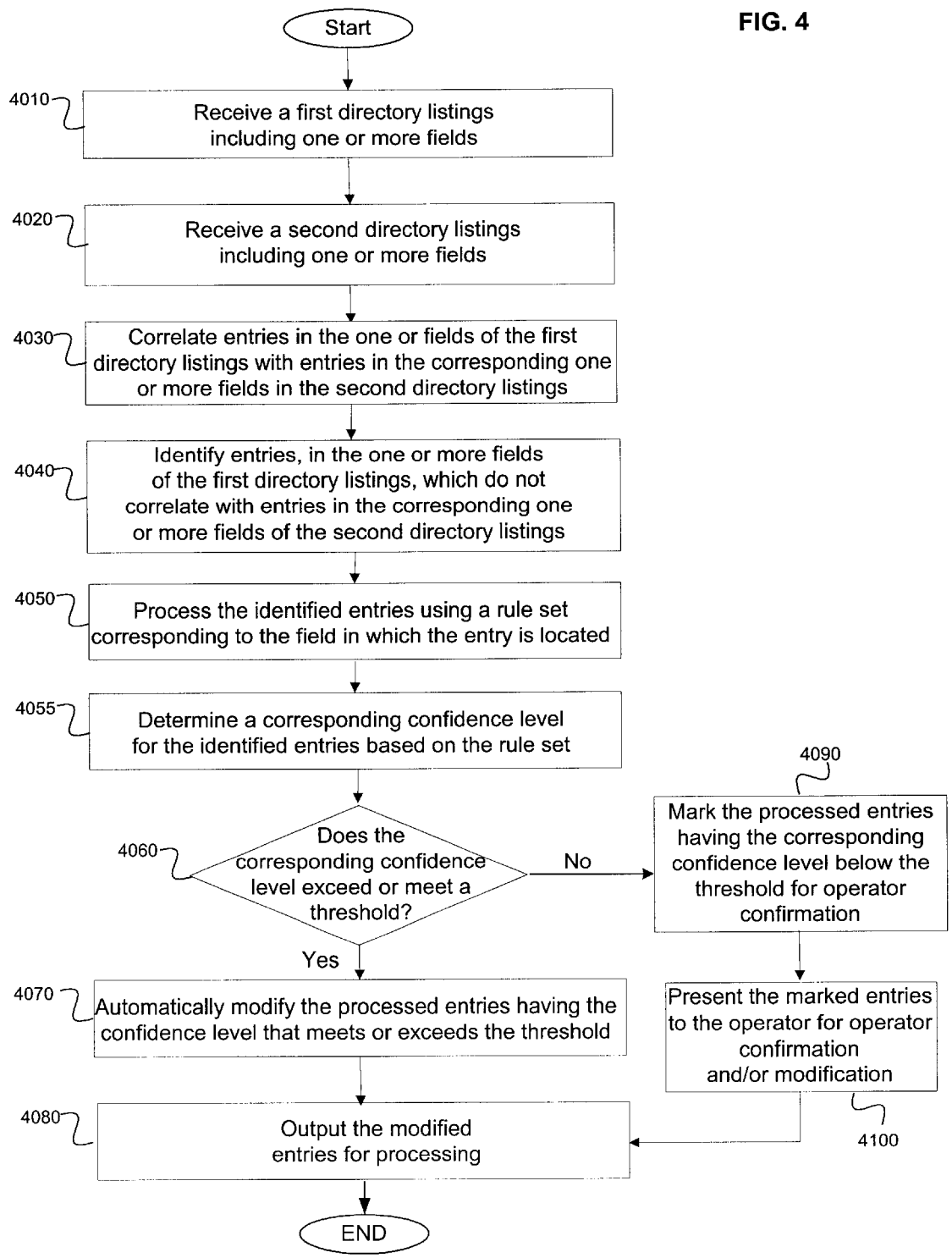
FIG. 4 is flowchart showing a listings pre-processing method in accordance with an exemplary embodiment of the present invention.

FIG. 4 is a flowchart illustrating a listings pre-processing method in accordance with an exemplary embodiment of the present invention. As shown in step 4010, a pre-processor 220 of listings pre-processing device 120 receives a first directory listings that includes one or more fields. For example, the first directory listing may be a white pages listings from database 110. The one or more fields included in the first directory listings may contain one or more entries and the entries may contain one or more symbol strings. The pre-processor receives a second directory listing that also includes one or more fields, as shown in step 4020. The second directory listing may be, for example, a reference database 270. The one or fields included in the second directory listings may contain one or more entries and the entries may contain one or more symbol strings After the pre-processor 220 receives the first and second directory listings, the pre-processor 220 correlates entries in the one or more fields of the first directory listings with entries in the corresponding one or more fields of the second directory listings, as shown in step 4030. As shown in step 4040, the pre-processor 220 identifies entries, in the one or more fields of the first directory listings, which do not correlate with entries in the corresponding one or more fields of the second directory listings. The identified entries are processed using a rule set corresponding to the field in which the entry is located, as shown in step 4050. The pre-processor 220, based on the corresponding rule set, determines a corresponding confidence level for the processed entries, as shown in step 4055.

In embodiments of the present invention, if the identified entries have a corresponding confidence level exceeding or meeting a threshold, then the processed entries are automatically modified, as shown in steps 4060–4070. In that case, the modified entries are output for processing, as shown in step 4080. For example, the modified entries may be output to a confirmed pre-processed listings database 250 and/or to an automated attendant 190.

If in step 4060 the identified entries have a corresponding confidence level below threshold, the processed entries are marked for operator confirmation, as shown in step 4090. The marked entries are presented to the operator for confirmation and/or further modification, as shown in step 4100.

In embodiments of the present invention, the operator may use a GUI interface to check the entries. The operator may modify the entries using existing rules or the operator may modify the entry using new rules. In embodiments of the present invention, the operator may edit or update a rule and/or may add a new rule to the rules database 211. If the operator edits an existing rule and/or adds a new rule, previously modified entries may the processed using the updated rule and/or the new rule. Once the entries are modified by operator intervention, and/or a modified or new rule set, the modified entries are output for processing, as shown in step 4080. As indicated above, the modified entries may be output to a confirmed pre-processed listings database 250 and/or to an automated attendant 190.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method for pre-processing entries in a directory listings, comprising:
   receiving a first directory listings including one or more fields, the one or more fields populated with entries including one or more symbol strings;
   receiving a second directory listings including one or more fields, the one or more fields of the second directory listings populated with entries including one or more symbol strings;
   correlating entries in the one or more fields of the first directory listings with entries in the corresponding one or more fields of the second directory listings;
   identifying entries, in the one or more fields of the first directory listings, which do not correlate with entries in the corresponding one or more fields of the second directory listings;
   processing the identified entries using a rule set corresponding to the field in which the entry is located;
   based on the rule set, determining a corresponding confidence level for the processed entries;
   automatically modifying the processed entries having the corresponding confidence level meeting or exceeding a threshold; and
   outputting the automatically modified entries for processing.

2. The method of claim 1, further comprising:
   marking the processed entries having the corresponding confidence level below the threshold for operator confirmation.

3. The method of claim 2, further comprising:
   presenting at least one of the marked entries to an operator using a graphical user interface;
   presenting one or more rules from the rules set, corresponding to the field in which the at least on of the marked entries is located, to the operator using the graphical user interface;

receiving an operator's input selecting at least one of the one or more rules; and processing the at least one of the marked entries in accordance with the operator's selection.

4. The method of claim 3, further comprising:

outputting the at least one of the marked entries processed in accordance with the operator's selection to an automated attendant.

5. The method of claim 3, further comprising:

outputting the at least one of the marked entries processed in accordance with operator's selection to a pre-processed listings database.

6. The method of claim 2, further comprising:

presenting at least one of the marked entries to an operator using a graphical user interface;

receiving an operator's inputs to manually modify the at least one of the marked entries; and modifying the at least one of the marked entries in accordance with the manual inputs from the operator.

7. The method of claim 2, further comprising:

presenting one or more rules from the rule set, corresponding to the field in which the at least one of the marked entries is located, to the operator using the graphical user interface;

receiving an operator's input modifying the at least one of the one or more rules; and processing the at least one of the marked entries in accordance with the modified rule.

8. The method of claim 1, wherein the processing step comprises:

selecting at least one of the identified entries;

based on the correlation with corresponding entries in the second database, determining whether the selected entry from the first database includes inverted symbol strings; and if the selected entry is determined to include the inverted symbol strings, correcting the inversion in the selected entry.

9. The method of claim 1, wherein the processing step comprises:

selecting at least one of the identified entries;

based on the correlation with corresponding entries in the second database, determining whether the selected entry from the first database includes an abbreviation; and if the selected entry is determined to include the abbreviation, expanding the abbreviation based on a closest correlation for the selected entry found in the second database.

10. The method of claim 1, wherein the processing step comprises:

selecting at least one of the identified entries;

based on the correlation with corresponding entries in the second database, determining whether the selected entry from the first database includes extraneous information; and if the selected entry is determined to include extraneous information, removing the extraneous information based on a correlation for the selected entry found in the second database.

11. The method of claim 1, wherein the second database is an official postal office database.

12. Apparatus for pre-processing entries in a directory listings database comprising:

a reference database configured to store one or more fields, the one or more fields populated with entries including one or more symbol strings;

a rules database configured to store one or more rule sets; and a processor configured to:

correlate entries contained in the directory listings database with entries in the corresponding one or more fields of the reference database, identify entries in the directory listings database which do not correlate with corresponding entries in the reference database, process the identified entries using the one or more rule sets from the rules database, based on the one or more rule sets, calculate a corresponding confidence level for the processed entries, and automatically modify the processed entries having the corresponding confidence level meeting or exceeding a threshold.

13. The apparatus of claim 12, wherein the processor to further output the automatically modified entries for processing.

14. The apparatus of claim 12, wherein the processor is configured with a word order normalizer that corrects word order of entries contained in the directory listings database.

15. The apparatus of claim 12, wherein the processor is configured with a street name expander that expands abbreviations of entries contained in the directory listings database.

16. The apparatus of claim 12, wherein the processor is configured with a township corrector that removes extraneous information from entries contained in the directory listings database.

17. The apparatus of claim 12, further comprising:

a confirmed listings database configured to store the automatically modified entries having the corresponding confidence level meeting or exceeding the threshold.

18. The apparatus of claim 12, further comprising:

a non-confirmed listings database configured to store entries that have the corresponding confidence level below the threshold.

19. A machine-readable medium having stored thereon a plurality of executable instructions, the plurality of instructions comprising instructions to:

receive a first directory listings including one or more fields, the one or more fields populated with entries including one or more symbol strings;

receive a second directory listings including one or more fields, the one or more fields of the second directory listings populated with entries including one or symbol strings;

correlate entries in the one or more fields of the first directory listings with entries in the corresponding one or more fields of the second directory listings;

identify entries, in the one or more fields of the first directory listings, which do not correlate with entries in the corresponding one or more fields of the second directory listings;

process the identified entries using a rule set corresponding to the field in which the entry is located;

based on the rule set, determine a corresponding confidence level for the processed entries;

automatically modify the processed entries having the corresponding confidence level meeting or exceeding a threshold; and output the automatically modified entries for processing.

20. The machine-readable medium of claim 19 having stored thereon additional executable instructions, the additional instructions comprising instructions to:

mark the processed entries having the corresponding confidence level below the threshold for operator confirmation.

21. The machine-readable medium of claim 20 having stored thereon additional executable instructions, the additional instructions comprising instructions to:

present at least one of the marked entries to an operator using a graphical user interface;

present one or more rules from the rules set, corresponding to the field in which the at least on of the marked entries is located, to the operator using the graphical user interface;

receive an operator's input selecting at least one of the one or more rules; and process the at least one of the marked entries in accordance with the operator's selection.

22. The machine-readable medium of claim 20 having stored thereon additional executable instructions, the additional instructions comprising instructions to:

output the at least one of the marked entries processed in accordance with the operator's selection to an automated attendant.

23. The machine-readable medium of claim 20 having stored thereon additional executable instructions, the additional instructions comprising instructions to:

output the at least one of the marked entries processed in accordance with operator's selection to a pre-processed listings database.

24. The machine-readable medium of claim 20 having stored thereon additional executable instructions, the additional instructions comprising instructions to:

present at least one of the marked entries to an operator using a graphical user interface;

receive an operator's inputs to manually modify the at least one of the marked entries; and modify the at least one of the marked entries in accordance with the manual inputs from the operator.

25. The machine-readable medium of claim 20 having stored thereon additional executable instructions, the additional instructions comprising instructions to:

present one or more rules from the rule set, corresponding to the field in which the at least on of the marked entries is located, to the operator using the graphical user interface;

receive an operator's input modifying the at least one of the one or more rules; and process the at least one of the marked entries in accordance with the modified rule.

26. The machine-readable medium of claim 19 having stored thereon additional executable instructions, the additional instructions comprising instructions to:

select at least one of the identified entries;

based on the correlation with corresponding entries in the second database, determine whether the selected entry from the first database includes inverted symbol strings; and if the selected entry is determined to include the inverted symbol strings, correct the inversion in the selected entry.

27. The machine-readable medium of claim 19 having stored thereon additional executable instructions, the additional instructions comprising instructions to:

select at least one of the identified entries;

based on the correlation with corresponding entries in the second database, determine whether the selected entry from the first database includes an abbreviation; and if the selected entry is determined to include the abbreviation, expand the abbreviation based on a closest correlation for the selected entry found in the second database.

28. The machine-readable medium of claim 19 having stored thereon additional executable instructions, the additional instructions comprising instructions to:

select at least one of the identified entries;

based on the correlation with corresponding entries in the second database, determine whether the selected entry from the first database includes extraneous information; and if the selected entry is determined to include extraneous information, remove the extraneous information based on a correlation for the selected entry found in the second database.

* * * * *